(No Model.) 4 Sheets—Sheet 4.

S. T. & C. JOHNSTON.
PLOW AND PULVERIZER.

No. 381,142. Patented Apr. 17, 1888.

Witnesses
Inventors
Sylvester T. Johnston and
Columbus Johnston,
by their Attorneys

UNITED STATES PATENT OFFICE.

SYLVESTER T. JOHNSTON, OF ST. LOUIS, AND COLUMBUS JOHNSTON, OF CLARKSVILLE, MISSOURI.

PLOW AND PULVERIZER.

SPECIFICATION forming part of Letters Patent No. 381,142, dated April 17, 1888.

Application filed December 23, 1887. Serial No. 258,848. (No model.)

*To all whom it may concern:*

Be it known that we, SYLVESTER T. JOHNSTON, of St. Louis, Missouri, and COLUMBUS JOHNSTON, both citizens of the United States, the latter residing at Clarksville, in the county of Pike and State of Missouri, have invented a new and useful Improvement in a Combined Plow and Pulverizer, of which the following is a specification.

Our invention relates to an improvement in a combined plow and pulverizer; and it consists in the peculiar construction and combination of devices, that will be more fully set forth hereinafter, and particularly pointed out in the claims.

Figure 1:
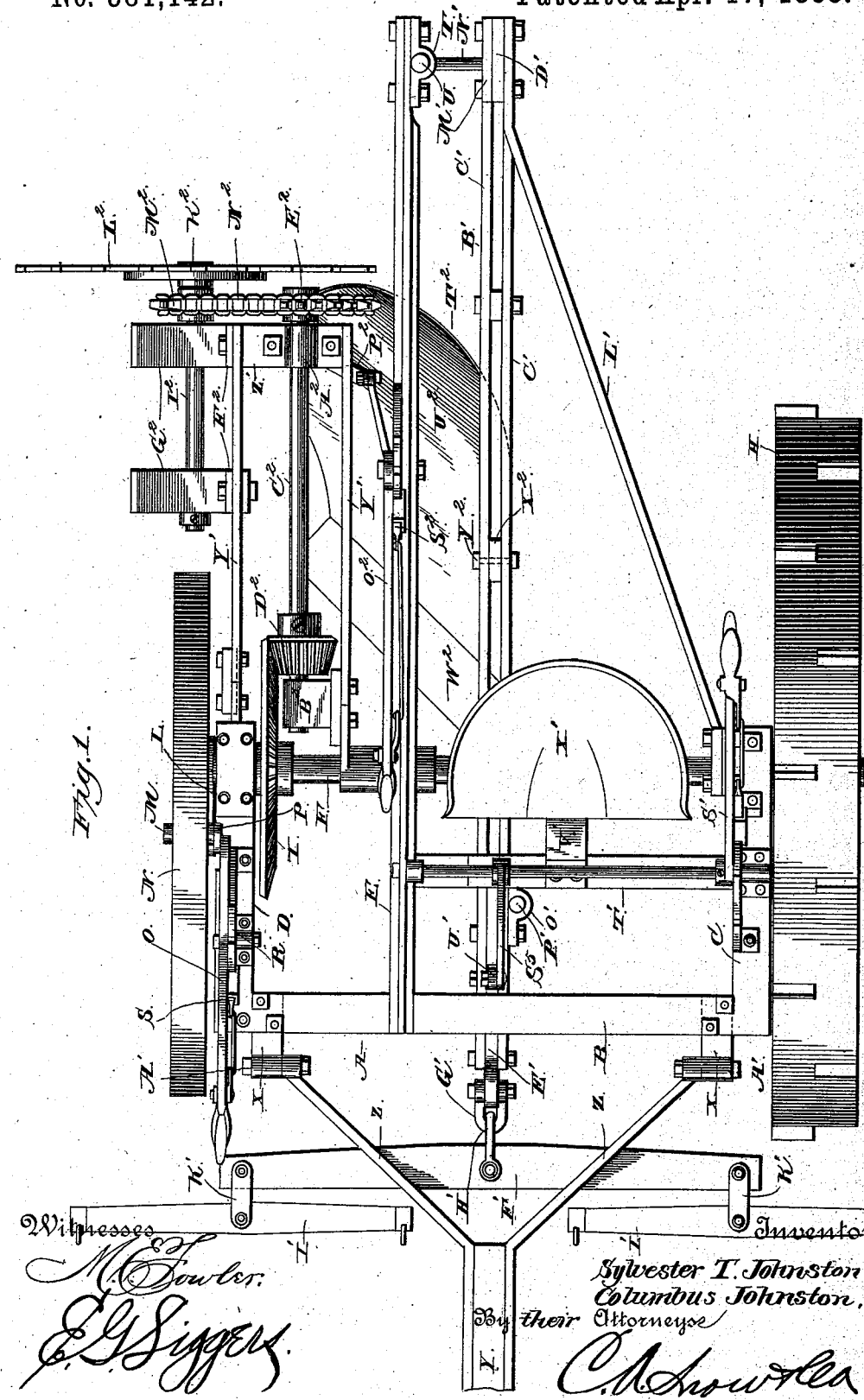
Figure 2:
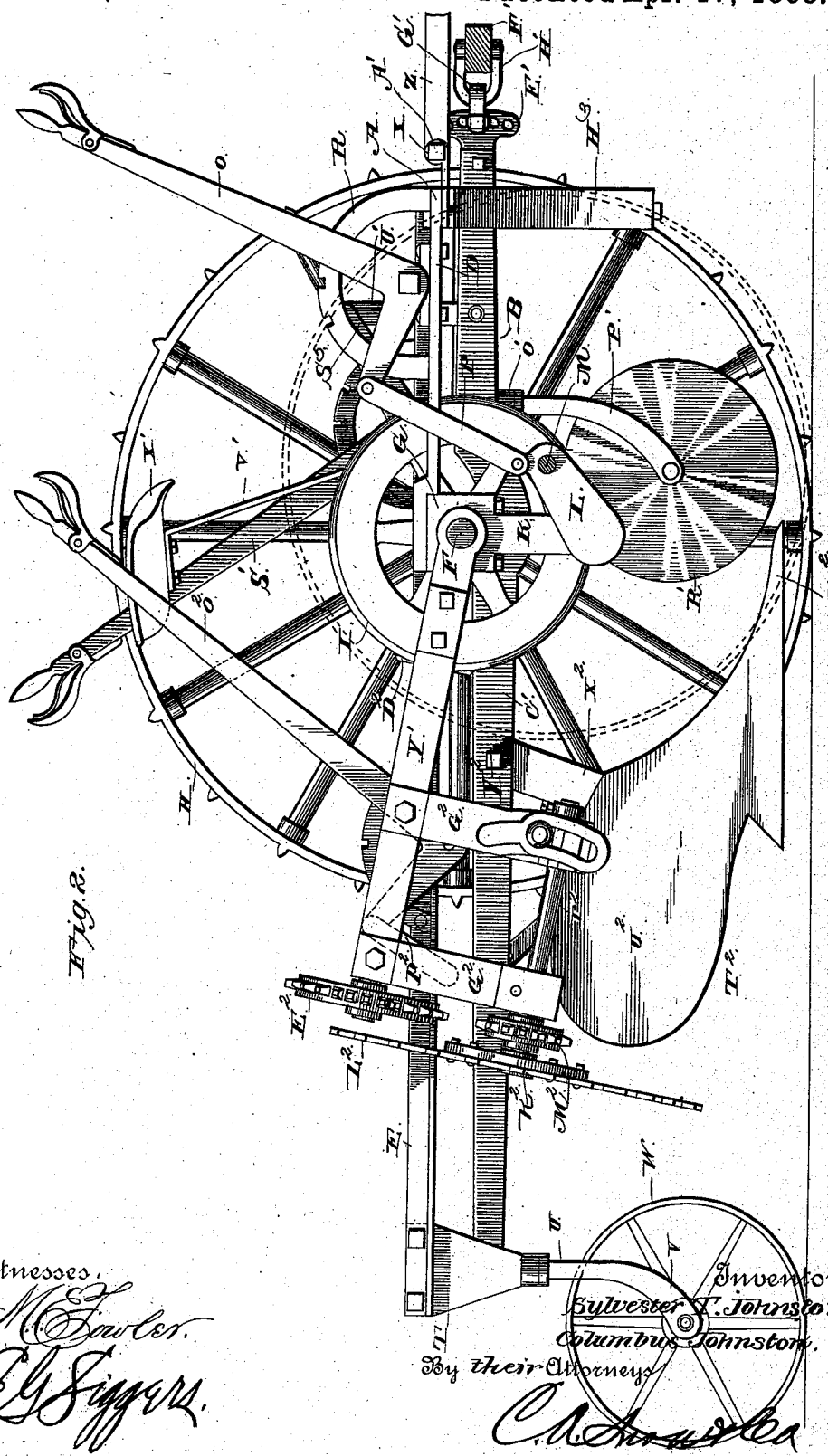
Figure 3:
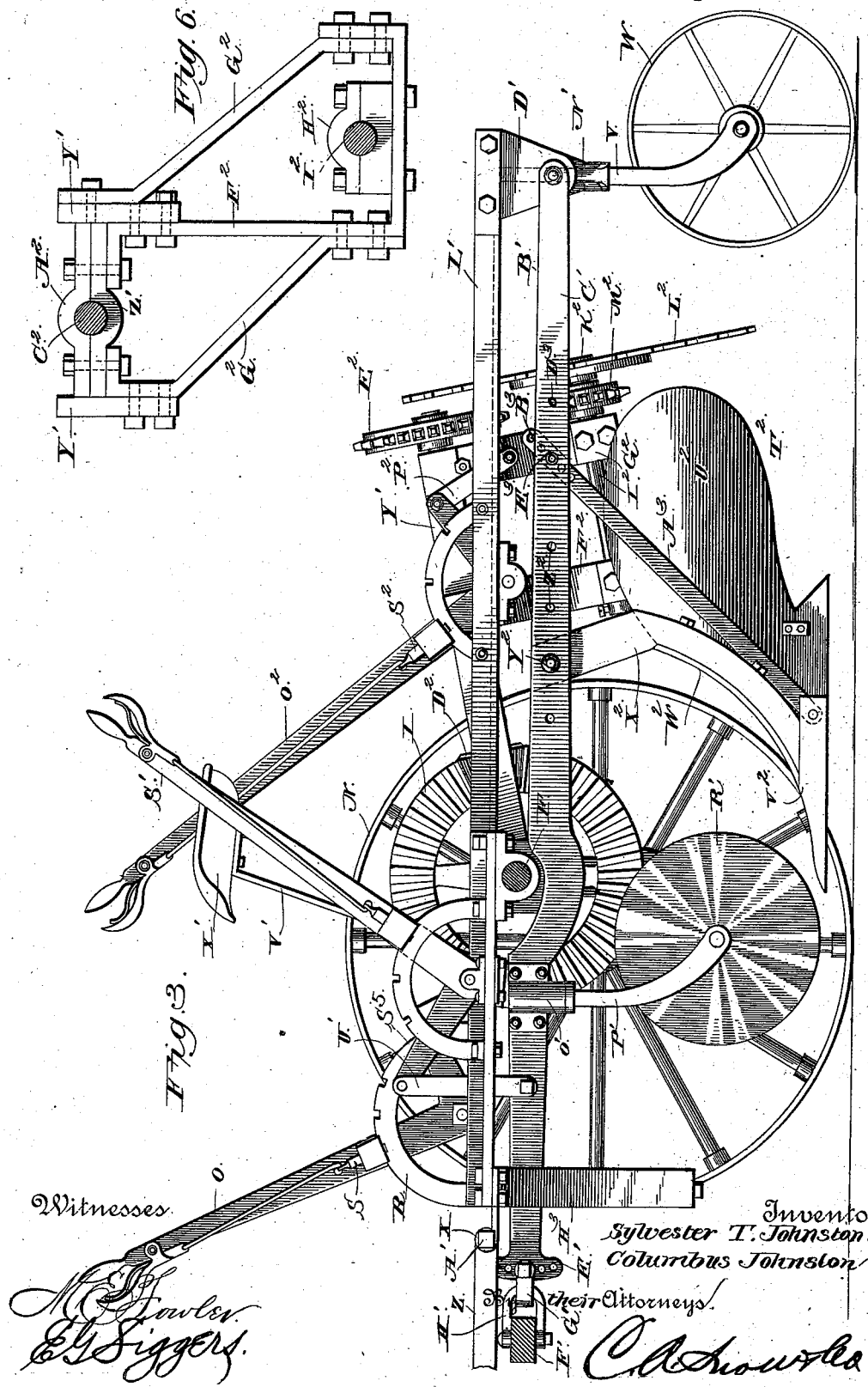
Figure 4:
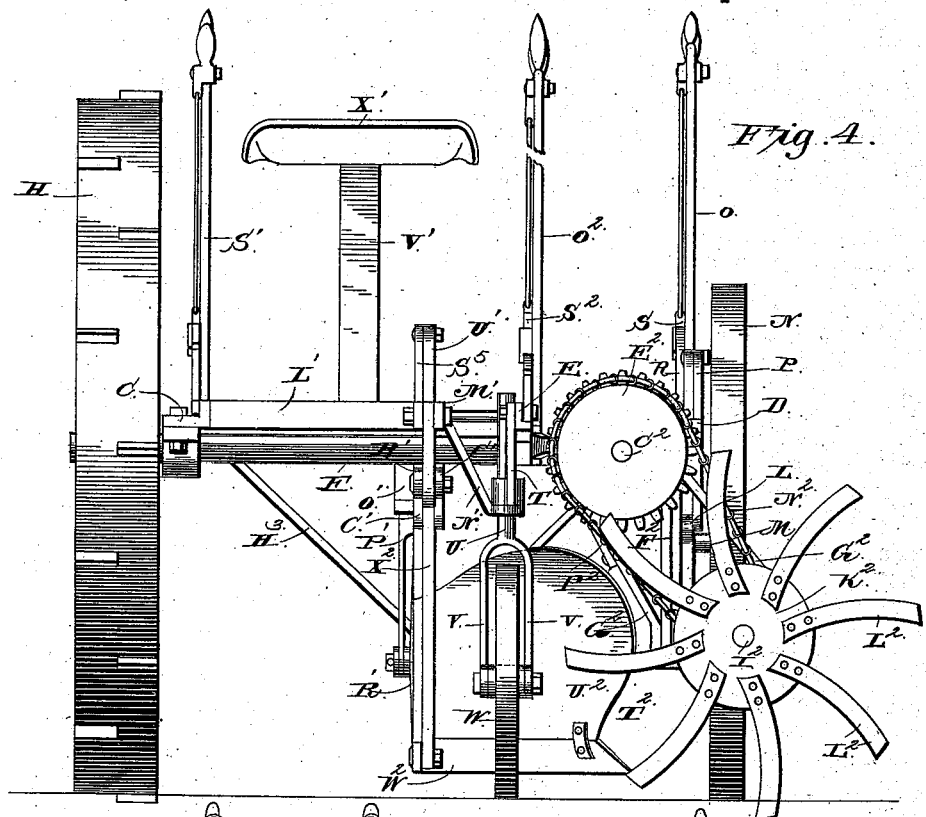
Figure 5:
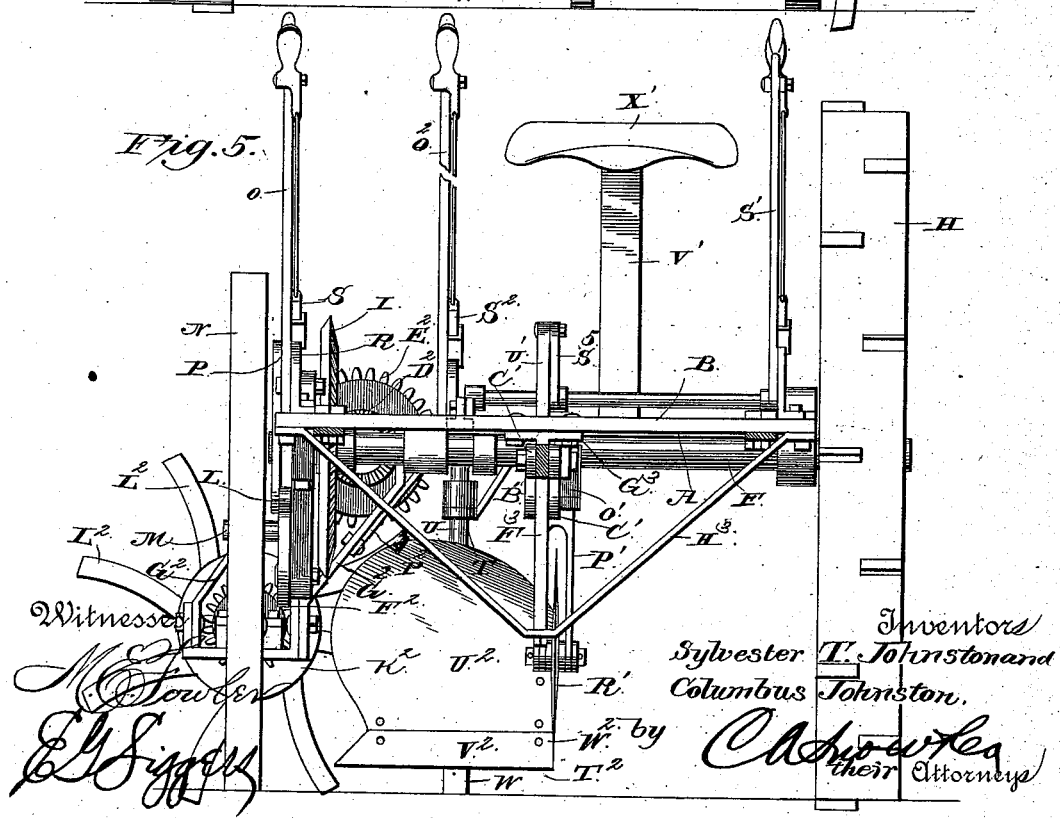

In the accompanying drawings, Figure 1 is a top plan view of a combined plow and pulverizer embodying our improvements. Fig. 2 is a side elevation of the same. Fig. 3 is a similar view of the other side of the plow. Fig. 4 is a rear elevation of the same. Fig. 5 is a front elevation. Fig. 6 is a detail rear elevation of a portion of our machine.

A represents a U-shaped frame comprising the front cross-bar, B, and rearward-extending arms C D at opposite ends of the same.

E represents a bar, which has its front end bolted to the cross-bar B at a suitable distance from the arm D, and the said bar extends rearward from the frame A for a considerable distance, as shown.

F represents the driving-shaft, which is journaled in bearings G, secured on the under sides of the arms C and D and the bar E. To one end of this shaft is keyed a large traction-wheel, H, which has a broad tread. To the opposite end of the said shaft is keyed a beveled gear-wheel, I.

K represents a vertical hanger, which depends from the bearing G, that is attached to arm D, and to the lower end of the said hanger is pivoted an arm, L, the free end of which has an outward-projecting spindle, M, on which is journaled a supporting furrow-wheel, N, that is much smaller than the wheel H.

O represents a bell-crank lever, which is pivoted on the upper side of the arm D, near the front end thereof, and has its rearward-extending arm connected to the free end of the arm L by means of a link, P.

R represents a segment plate or standard, which is secured on the arm D, bears against the inner side of the lever O, and is provided with a series of notches in its periphery, which notches are adapted to be engaged by a bolt, S, of the usual construction, with which the lever O is provided, and thereby the said lever may be secured in any desired position, so as to raise or lower the free end of the arm L, and thereby raise or lower the side of frame which rests on the wheel N, so as to level the sides of the frame of the plow at all times.

To the rear end of the bar E, on the inner side of the same, is bolted a bearing, T.

U represents a vertical standard, which has its upper end journaled in the bearing T, and the said standard is bifurcated, and thereby provided with a pair of arms, V, between the lower ends of which is journaled a furrow-wheel, (a caster-wheel,) W.

X represents a pair of blocks, which are bolted to the cross-bar B, near the ends of the same, the front ends of the said blocks projecting beyond the front side of the said cross-beam.

Y represents the tongue, which is provided at its rear end with a pair of diverging draft-arms, Z, which are pivotally connected to the blocks S by means of bolts A'.

B' represents a plow-beam, which comprises a pair of parallel metallic bars, C', having their rear ends connected by a vertical plate, D', which has its lower end bolted between them. The front ends of the said bars C' are connected by a clevis, E', which is bolted thereto.

F' represents a doubletree, which is connected to the clevis by means of a loop, G', and a yoke, H'. To the ends of the said doubletree are connected the usual singletrees, I', by means of straps or links K'.

L' represents a brace-arm, which has its front end bolted to the inner side of the arm C, at the rear end thereof, and has its rear end bolted to the upper side of the vertical plate D', the said brace-rod being arranged diagonally, as shown in Fig. 1.

M' represents a plate, which is bolted to the opposite side of the upper end of plate D' by the same bolts which secure the rear end of the brace-arm to the said plate D', and extending downward and outward from the said plate M' is an arm, N', the lower end of which has a vertical bearing for the lower portion of the vertical standard U of the furrow-wheel W. The rear end of the plow-beam is pivotally connected to the lower end of plate D' by a single bolt, and thereby the front end of the said plow-beam is adapted to be raised or lowered.

O' represents a bearing-block, which is secured on the plow-beam at a suitable distance from the front end thereof, and in the said bearing-block is journaled the upper end of the standard P', to the lower end of which is journaled a revolving colter, R'.

S' represents a lever, which is pivoted on a shaft on the upper side of a cross-bar, T', that connects the arm C with the bar E, and is arranged parallel with and at a suitable distance in rear of the cross-bar B. On the shaft directly over the plow-beam is a lever, $S^5$, which is connected to the plow-beam by means of a link, U'. The function of the said lever is to raise or lower the front end of the plow-beam, and the said lever S' is provided with devices similar to those previously described in connection with the lever O, whereby said lever S' may be secured at any desired angle.

V' represents a supporting-bar, which is secured to the cross-arm T' and has its rear end upturned and adapted to support the seat X' for the driver.

Y' represents a pair of arms, which have their front ends pivoted to one end of the shaft F on opposite sides of the wheel I. The rear ends of the said arms are connected by a cross-bar, Z', on which is secured a bearing-block, $A^2$. To the front end of the inner arm Y' is secured a bearing-block, $B^2$, which projects from the inner side of said arm, and in the said bearing-blocks $A^2$ and $B^2$, is journaled a longitudinal shaft, $C^2$, which has a pinion, $D^2$, that meshes with the wheel I. To the rear end of said shaft is secured a sprocket-wheel, $E^2$. From the outer arm Y', near the rear end thereof, depends a pair of standards or hangers, $F^2$, which are strengthened by suitable braces, $G^2$, and to the lower ends of said hangers are secured bearing-boxes $H^2$, which are adapted to move laterally and in which is journaled a longitudinal shaft, $I^2$. To the extreme rear end of the shaft $I^2$ is secured a circular hub-disk, $K^2$, to which is secured a series of radial curved knives or cutters, $L^2$. The said disk and its knives or cutters constitute a pulverizer, the operation of which will be described hereinafter. Immediately in front of the disk $K^2$, and rigidly secured to the shaft $I^2$, is a sprocket-wheel, $M^2$, which is smaller than the wheel $E^2$ and is connected thereto by an endless chain, $N^2$.

$O^2$ represents a bell-crank lever, which is pivoted to the bar E at a suitable distance from the rear end thereof, and has its rearward-extending arm connected to one of the standards or hangers $F^2$ by means of a link, $P^2$. The arms Y' and the devices attached thereto constitute a swinging frame, which carries the pulverizer and the connections between the same and the driving-shaft, and the function of the hand-lever $O^2$ is to raise or lower the rear end of the said frame, and thereby raise or lower the rear end of the pulverizer. The lever $O^2$ has a segment-plate, $R^2$, which is secured to the bar E and bears against the side of the lever, and to the latter is secured a spring-actuated bolt, $S^2$, of the usual construction, which is adapted to engage either of a series of openings or notches in the segment-plate, so as to secure the lever, and thereby secure the frame, at any desired position.

$T^2$ represents a plow, which comprises a mold-board, $U^2$, having a shear or cutting edge, $V^2$, and is provided with a point, $W^2$, the usual landside and sole-plate being dispensed with.

$X^2$ represents the plow-standard, which is bolted to the landside-edge of the mold-board and has its upper end inserted between the bars C' of plow-beam B' and pivoted between the same on a bolt, $Y^2$. A series of openings, $Z^2$, are made through the plow-beam for the reception of the bolt $Y^2$, so that the standard may be secured to the plow-beam at any desired distance from the front end thereof.

$A^3$ represents a brace-arm, which has its lower end pivoted to the plowshare, as shown, and has its upper end arranged between the bars C' of the plow-beam and provided with a series of openings, $B^3$, adapted to register with openings $D^3$ in the plow-beam. A bolt, $E^3$, passes through the openings in the plow-beam and through one of the openings in the adjusting brace-arm, so as to secure the latter at any desired angle, and thereby secure the plowshare at any desired angle with relation to the ground, so that the plow will be drawn into and held in the ground.

It is obvious that by dispensing with the landside and sole-plates the friction on the landside of the plow and on the bottom thereof is entirely obviated, and consequently the draft of the plow is very materially reduced.

In order to prevent the front end of the plow-beam from vibrating laterally, we provide a standard, $F^3$, which is provided at its upper end with a T-head, $G^3$, that is bolted to the under side of the front bar, B, of the frame. This standard extends down between the bars C' of which the plow-beam is composed, so that the plow-beam is free to be moved vertically on the standard. The lower end of the standard is prevented from vibrating laterally by means of a brace-rod, $H^3$, which has its ends bolted to the under side of the cross-bar B at the ends thereof, and has its central portion secured to the lower end of standard $F^3$, as shown in Fig. 5. The said standard $F^3$ and brace-rod $H^3$ also serve as a truss, which very materially strengthens the frame.

The operation of our invention is as follows: When plowing, the front end of the plow-beam is lowered and the plow is adjusted to the desired angle and caused to run at the desired depth into the ground by hitching the whiffletree at the proper height into the clevis on the front end of plow-beam. The point and cutting-edge of the plowshare retain the same position to the ground at any depth, because the furrow-wheel W follows in the furrow, which lowers the rear end of the frame in proportion to the depth of the furrow plowed. The forward motion of the plow causes the traction-wheel H to rotate by contact with the earth, and thereby rotate the shaft F, to which it is secured. This imparts rotary motion to the gear-wheel I, which is in turn imparted to the shaft $C^2$, the latter revolving at a higher rate of speed than the shaft F, for the reason that the pinion $D^2$ is much smaller than the wheel I. The rotary motion of the shaft $C^2$ is communicated to the shaft which carries the pulverizer by reason of the sprocket-wheels and endless chain, previously described, and, inasmuch as the sprocket-wheel on the pulverizer-shaft is smaller than the sprocket-wheel on the shaft $C^2$, the pulverizer is rotated at considerable speed. The pulverizer is located, as will be observed by reference to Figs. 1 and 2, on the furrow side of the plowshare to the rear and right-hand side just far enough to allow the furrow to be turned over in front of the pulverizer, and when the pulverizer-frame is lowered by means of the lever $O^2$ the rapidly-revolving teeth or cutters of the pulverizer serve to cut transversely downward into and through the furrows, and thereby effectually pulverize the earth and level it and render the use of a harrow entirely unnecessary. If it be desired to use the plow without the pulverizer, the pulverizer-frame is supported in an elevated position, and the pinion $D^2$ is slipped rearward on the shaft $C^2$, so as to be out of engagement with the gear-wheel I. Said pinion $D^2$ is provided with a set-screw, as shown in Fig. 1, by means of which the pinion may be secured to the shaft at any desired point, either when engaged with or disengaged from the gear-wheel I.

By having the whiffletree connected to the front end of the plow-beam and not to the tongue the draft is exerted directly on the plowshare, and consequently the frame is relieved of the strain. The colter in advance of the plow operates in the usual manner.

It will be understood that the frame and the wheel H resist the side strain that is on the mold-board plow, thereby obviating the use of a landside, and the caster-wheel W obviates the use of a heel or sole to the plow.

Having thus described our invention, we claim—

1. The combination, in a wheel-plow, of the frame having the rearward-extending bar E, the trailing wheel W, supporting the rear end of said bar, the plow-beam, pivotal connections between the rear ends of the beam E and plow-beam, the lever S', pivotally secured to the frame, and the link connecting the same to the front end of the plow-beam, whereby the latter may be raised or lowered, substantially as described.

2. The combination, in a wheel-plow, of the frame to which the plow-beam is connected, the shaft F, journaled in said frame and having the traction-wheel H, the pulverizer-frame pivoted or hinged to the shaft, the shaft $I^2$, journaled to the pulverizer-frame and having the pulverizer, and connections between the said pulverizer and the shaft F to transmit rotary motion of the latter to the former, and the lever to raise or lower the pulverizer-frame, substantially as described.

3. The combination, in a wheel-plow, of the frame having the driving-shaft F, provided with the gear-wheel I, the pulverizer-frame pivoted or hinged at one end to shaft F and having the shaft $C^2$ and the shaft $I^2$, the pinion $D^2$ on shaft $C^2$, meshing with gear-wheel I, the pulverizer attached to wheel $I^2$, the chain-and-pulley connections between the shafts $C^2$ and $I^2$, and the lever to raise and lower the free end of the pulverizer-frame, substantially as described.

4. The combination, in a wheel-plow, of the frame, the wheel H on one side of the frame, the standard K, depending from the opposite side thereof, the arm L, pivoted to said standard and having spindle M, the supporting furrow-wheel N, journaled on said spindle, the lever, connections between the same and arm L to raise and lower the latter, the rearward-extending bar E, and the furrow-wheel W, having the vertical shaft or support journaled to the rear end of bar E, substantially as described.

5. The combination of the frame having the rearward-extending bar E, the diagonal bar L', connections between the bar L' and the rear end of bar E, the plate or standard M', depending from the rear end of bar L', the plow-beam having its rear end pivoted to said plate or standard and provided at the front end with the clevis, and the lever to raise and lower the front end of the plow-beam, substantially as described.

6. The combination, in a wheel-plow, of the frame having the supporting-wheels of unequal diameters on opposite sides and having the rearward-extending arm, the tongue pivotally attached to the front end of the frame, the furrow-wheel at the rear end of the arm, the plow-beam having its rear end pivotally connected to the rear end of the arm and having the clevis at its front end, and the lever to raise and lower the front end of the plow-beam, substantially as described.

7. The combinaton of the frame having the rearward-extending bar E, the traveling caster-wheel W, supporting the rear end of said bar, the wheels H and N, of unequal diameter, on opposite sides of the frame, the plow-beam having its rear end pivotally connected to bar E, and the lever to raise and lower the front end of the plow-beam, and the lever O, and connections to raise and lower the wheel N, substantially as described.

8. The frame having the traction-wheel H, the plain wheel N, the driving shaft or axle F for the traction-wheel, the pulverizer driven thereby, and the plow share and beam, the arrangement of the traction-wheel on one side of the plow-beam obviating the use of a landside, as set forth.

9. The frame having the traction-wheel H, the plain wheel N, mounted on an independent bearing, the driving shaft or axle F for the wheel H, the pulverizer connected to the driving-shaft, and the furrow-wheel W, running in rear of the plow in line with the furrow and obviating the use of a sole or heel to the plow, and the arrangement of the traction-wheel H on one side of the plow obviating the use of a landside to the plow, as set forth.

In testimony that we claim the foregoing as our own we have hereto affixed our signatures in presence of two witnesses.

SYLVESTER T. JOHNSTON.
COLUMBUS JOHNSTON.

Witnesses as to signature of S. T. Johnston:
C. D. GREENE, Jr.,
ARTHUR D. GREENE.

Witnesses as to signature of Columbus Johnston:
WILEY CAMPBELL,
NEWTON SLEMMENS.